US010051438B2

(12) United States Patent
Asbury et al.

(10) Patent No.: US 10,051,438 B2
(45) Date of Patent: Aug. 14, 2018

(54) MESSAGE MATCHING

(71) Applicant: TIBCO Software Inc., Palo Alto, CA (US)

(72) Inventors: Stephen Asbury, Pasadena, CA (US); Russell Selph, Palo Alto, CA (US)

(73) Assignee: TIBCO SOFTWARE INC., Palo Alto, CA (US)

(*) Notice: Subject to any disclaimer, the term of this patent is extended or adjusted under 35 U.S.C. 154(b) by 681 days.

(21) Appl. No.: 14/012,712

(22) Filed: Aug. 28, 2013

(65) Prior Publication Data

US 2015/0067094 A1  Mar. 5, 2015

(51) Int. Cl.
G06F 15/16 (2006.01)
H04W 4/08 (2009.01)

(52) U.S. Cl.
CPC .................... *H04W 4/08* (2013.01)

(58) Field of Classification Search
CPC ........................................ H04W 4/08
USPC ........ 709/217, 206, 201; 707/776, 769, 827; 370/389
See application file for complete search history.

(56) References Cited

U.S. PATENT DOCUMENTS

| | | | | |
|---|---|---|---|---|
| 6,301,615 B1* | 10/2001 | Kutcher | ................. | G06F 17/24 709/224 |
| 6,851,087 B1* | 2/2005 | Sibert | ................. | G06F 15/173 715/505 |
| 2004/0122906 A1 | 6/2004 | Goodman et al. | | |
| 2005/0182776 A1* | 8/2005 | Yennie | ............. | G06F 17/30327 |
| 2007/0112731 A1* | 5/2007 | Balasubramanian | | G06F 17/30985 |
| 2011/0082884 A1* | 4/2011 | Hollingsworth | .. | G06F 17/30864 707/776 |
| 2011/0191425 A1* | 8/2011 | Brodeur | ................. | H04L 12/56 709/206 |
| 2011/0264767 A1* | 10/2011 | Liu | ........................ | G06F 21/10 709/217 |
| 2012/0131046 A1* | 5/2012 | Leshchiner | ....... | G06F 17/30442 707/769 |
| 2012/0284317 A1* | 11/2012 | Dalton | ................. | G06F 17/301 707/827 |
| 2015/0032827 A1* | 1/2015 | Tyler | ...................... | H04L 51/16 709/206 |

* cited by examiner

*Primary Examiner* — Thuong Nguyen
(74) *Attorney, Agent, or Firm* — McGuireWoods LLP

(57) ABSTRACT

Processing a message is disclosed. For each field group applicable to a message from one or more unique field groups of one or more fields identified using one or more content matchers, a compiled message corresponding to the field group applicable to the message is generated. It is determined whether one or more of the compiled messages matches one or more of the one or more content matchers.

14 Claims, 3 Drawing Sheets

MESSAGE MATCHING

BACKGROUND OF THE INVENTION

Messages such as news, stock quotes, user messages, etc. may be received by one or more recipients and/or subscribers of the message. For example, one or more subscribers subscribe to a desired message stream. Often a subscriber must subscribe to all messages of a predetermined message stream. For example, the message communication infrastructure is configured to include predefined message streams/channels/groupings of specific message topics/types/categories. A subscriber to the predetermined message group/stream will often always receive all messages of the grouping regardless of whether the subscriber desires to receive all messages of the grouping. Thus a message subscriber/receiver is often unable to only subscribe to specific message topics/types/categories desired by the subscriber/receiver because either the desired grouping does not exist or the existing grouping is too broad or specific. Therefore there exists a need for a better way to send and receive messages to desired recipient(s) with more flexibly.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing a message is disclosed. In some embodiments, for each unique group of one or more fields identified by one or more content matchers applicable to a message, a compiled message corresponding to the group of one or more fields is generated. For example, a message to be distributed to one or more recipients is received. The received message is processed to determine whether it includes content defined to be of interest by one or more message subscribers. Content matchers identify interested content of associated message subscribers. By converting the message to a compiled message format associated with a content matcher, it may be efficiently determined whether the message matches one or more content matchers. It is determined whether one or more of the compiled messages matches one or more of the content matchers applicable to the message. In some embodiments, if a matching content matcher is found, one or more subscribers associated with the matched content matcher are provided the message.

Figure 1:
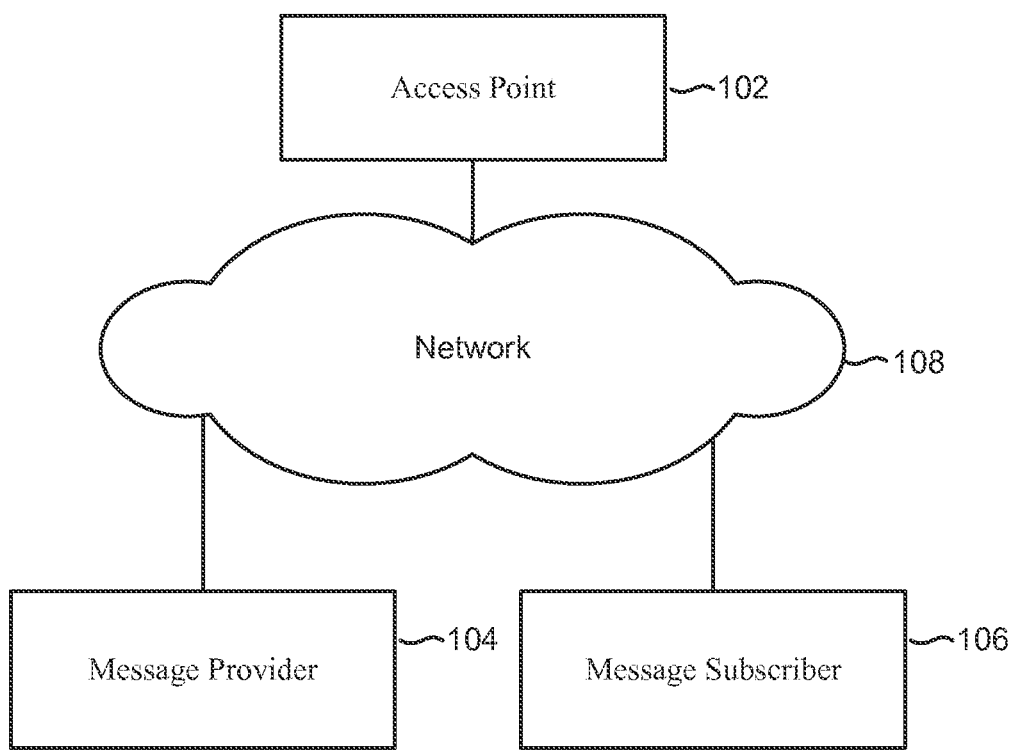
FIG. 1 is a block diagram illustrating an embodiment of a system for distributing messages.

FIG. 1 is a block diagram illustrating an embodiment of a system for distributing messages. Access Point 102 is connected to message provider 104 and message subscriber 106 via network 108. Message provider 104 sends a message to be provided to one or more message subscribers. For example, message provider 104 sends a message to access point 102 to be distributed and access point 102 distributes the message to one or more subscribers (e.g., message subscriber 106) of the message. In some embodiments, the message is distributed to all subscribers (e.g., message subscriber 106) that have subscribed to a message subject identified for the message. For example, the message is identified with a subject from a predetermined list of possible message subjects. In some embodiments, the message is distributed to all subscribers that have subscribed to messages provided by message provider 104. In some embodiments, the message is distributed to all subscribers specified by the message.

In some embodiments, the message is distributed to all subscribers that have subscribed to one or more content values included in the message. For example, content matchers identify interested content of associated message subscribers. By converting the message to a compiled message format associated with a content matcher, it may be efficiently determined whether the message matches one or more content matchers. It is determined whether one or more of the compiled messages matches one or more of the content matchers applicable to the message. If a matching content matcher is found, one or more subscribers (e.g., message subscriber 106) associated with matched content matter is provided the message.

In some embodiments, the system of message provider 104 may be also configured to receive one or more messages. For example, a message received from another message provider is provided to message provider 104 by access point 102. In some embodiments, message subscriber 106 is configured to send a message. For example, message subscriber 106 provides a message to access point 102 to allow access point 102 to distribute the message to applicable destination(s). In various embodiments, message provider 104 and/or message subscriber 106 includes C and/or JAVA programming language-based desktop and/or server clients. In some embodiments, message provider 104 and/or message subscriber 106 includes a mobile and/or web-based clients. Examples of message provider 104 and/or message subscriber 106 include a server, a desktop computer, a mobile computer, a mobile phone, a tablet computer, or any other type of computer. In some embodiments, access point 102 (e.g., including a server) performs translation between message formats. For example, a message received in a first format (e.g., a proprietary format of the message sender) may be converted to a second message format (e.g., JavaScript Object Notation format), and vice-a-versa (e.g., bi-directional conversion), for processing and/or compatibility with the format of the message recipient.

The components shown in FIG. 1 may be implemented in one or more computers, servers, storage devices, networking components, and/or virtual components/networks. For example, any number of components shown in FIG. 1 may be included in the same device. Network 108 may include one or more of the following: a direct or indirect physical communication connection, mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of components have been shown to simplify the diagram, additional instances of any of the components shown in FIG. 1 may exist. For example, other instances of any component shown in FIG. 1 may exist. Components not shown in FIG. 1 may also exist.

Figure 2:
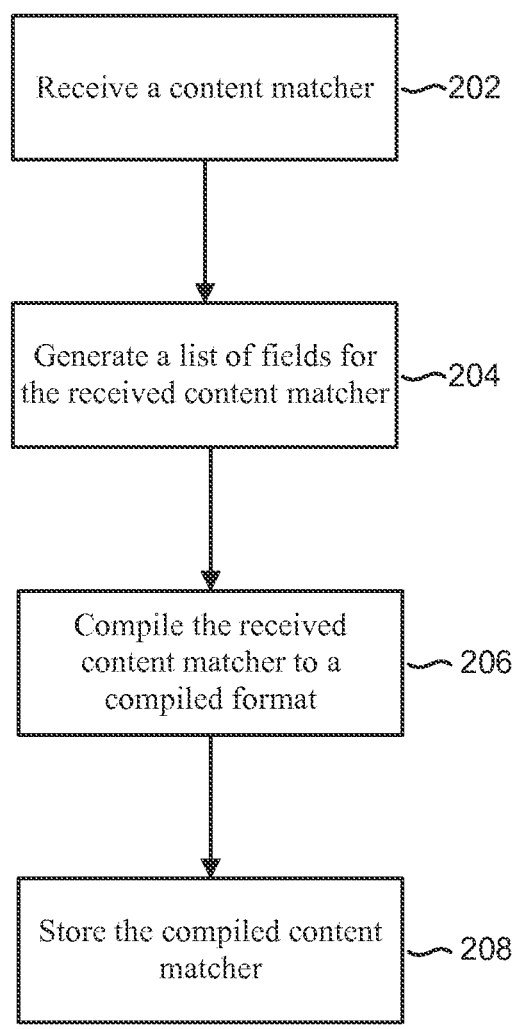
FIG. 2 is a flowchart illustrating an embodiment of a process for processing a message content matcher.

FIG. 2 is a flowchart illustrating an embodiment of a process for processing a message content matcher. The process of FIG. 2 may be implemented in access point 102 of FIG. 1.

At 202, a content matcher is received. In some embodiments, receiving the content matcher includes receiving a specification of at least a portion of content of a message that is desired to be received by one or more users associated with the content matcher. The specification includes a specification of content, if included in a message being analyzed, that allows the content matcher to match the message. In some embodiments, the content matcher specifies a field and an associated value. The content matcher matches a message if the message includes in its contents the specified field and the associated value of the content matcher in the field of the message. The content matcher may be specified in a format that allows a specification of a field/key/tag/object and an associated value. For example, the content matcher may be specified in one or more of the following formats: JavaScript Object Notation (i.e., JSON), Extensible Markup Language (i.e., XML), and YAML.

An example of a JSON format content matcher is shown below.

---
MATCHER
{
    "name": "steve"
    "age": 21
}
---

The content matcher above named "MATCHER" matches a message if each of the field/value pair included in the content matcher matches the corresponding value of the field included in the message. The "MATCHER" content matcher specifies that in order for a message to match the content matcher, the message must include a field identified as "name" that includes an associated value "steve" and another field identified as "age" that includes an associated numerical value 21. In some embodiments, a data type specified for a value of the content matcher field/value pair must match the data type of matching content of a message in order for the message to match the content matcher. In some embodiments, the field/value pair of the content matcher includes a plurality of values for a single field and in order for a message to match the content matcher, the message must include the plurality of values in a matching field of the message. In some embodiments, the associated value of a field/value pair specified in the content matcher is a Boolean value. For example, in the event the Boolean value is specified as true in the field/value pair of the content matcher, the field/value pair of the content matcher matches a field/value pair of a message if the field/value pair of the message includes the field of the content matcher field/value pair with any value, and in the event the Boolean value is specified as false in the field/value pair of the content matcher, the field/value pair of the content matcher matches a message if the message does not include the field of the content matcher field/value pair.

All field/value pairs of the content matcher must match at least a portion of contents of a message in order for the content matcher to match the message. For example, the above "MATCHER" content message does match message "MESSAGE 1" below but does not match message "MESSAGE 2" because "MESSAGE 2" does not include an "age" field with a value of 21.

---
MESSAGE 1
{
    "name": "steve"
    "age": 21
    "phone": "555-1212"
}
MESSAGE 2
{
    "name": "steve"
    "phone": "555-1212"
}
---

In some embodiments, one or more identifiers of subscriber(s) interested in receiving messages that match the received content matcher is received with the received content matcher. In some embodiments, the identifier of the subscriber interested in receiving messages that match the received content matcher is a sender of the content matcher. The received content matcher may be one of a plurality of content matchers received.

At 204, a list of fields is generated for the received content matcher. In some embodiments, generating the field list includes determining and extracting field identifiers specified in the received content matcher. The fields of the list may be placed in a determinable order. For example, the fields are placed in an order associated with an alphabetical order of the fields (e.g., alphabetical order or reverse alphabetical order). For example, for the above example "MATCHER" content matcher, a field list of ["age", "name"] is generated. In some embodiments, it is determined whether the generated list is unique across previously received/processed/registered content matchers. Two content matchers may produce the same generated field list because each content matcher specifies the same fields but different associated values of the fields. Determining whether the list is unique may include comparing the field list against stored unique field lists. If the field list is unique, the list is stored in a data storage structure of unique field lists. Examples of the data storage structure include a list, a table, a hash table, a database, or any other data storage structure for storing data. If the field list is not unique the list is not stored in the data storage structure of the unique field lists. In some embodiments, each field in the field list may be associated with a data type of the associated value of the field. For example, the data type may be a string, a character, an integer, a floating point number, or a Boolean value. In some embodiments, the generated field list is used when determining whether a message matches any content matcher.

At 206, the received content matcher is compiled to a compiled format. In some embodiments, compiling the content matcher includes reordering and formatting contents of the content matcher to a standardized single line format (e.g., single string). In some embodiments, compiling the content matcher includes (1) extracting contents of the content matcher (e.g., extract contents between beginning and ending brackets without content matcher name), (2) ordering field/value pairs included in the extracted contents in a determined order (e.g., order in alphabetical order), (3) reversing ordering of each field/value pair so that it becomes a value/field pair (e.g., "age":"21" becomes "21":"age"), and (4) removing white spaces and reformatting resulting content (e.g., remove white spaces and separate each value/field pair with a comma rather than a new line). For example, for the above example "MATCHER" content matcher, the compiled content matcher is: "21":"age","steve":"name". In some embodiments, by reversing ordering of each field/value pair so that it becomes a value/field pair, hash table collisions are minimized when storing the compiled content matcher.

At 208, the compiled content matcher is stored. The compiled content matcher is stored in a data storage structure such as a list, a table, a hash table, a database, or any other data storage structure for storing data. Storing the compiled content matcher includes storing and registering the compiled content matcher as being associated with one or more identifiers of subscriber(s) interested in receiving messages that match the content matcher (e.g., a list of subscriber identifier(s) received at 202 along with the received content matcher). For example, the compiled content matcher is stored as a key of the associated value of one or more associated subscriber identifier(s). In some embodiments, the stored/registered compiled content matcher is used when determining whether a message matches any stored/registered content matcher, and if a match is found, the message is provided to the associated subscriber(s) of the matched content matcher.

Figure 3:
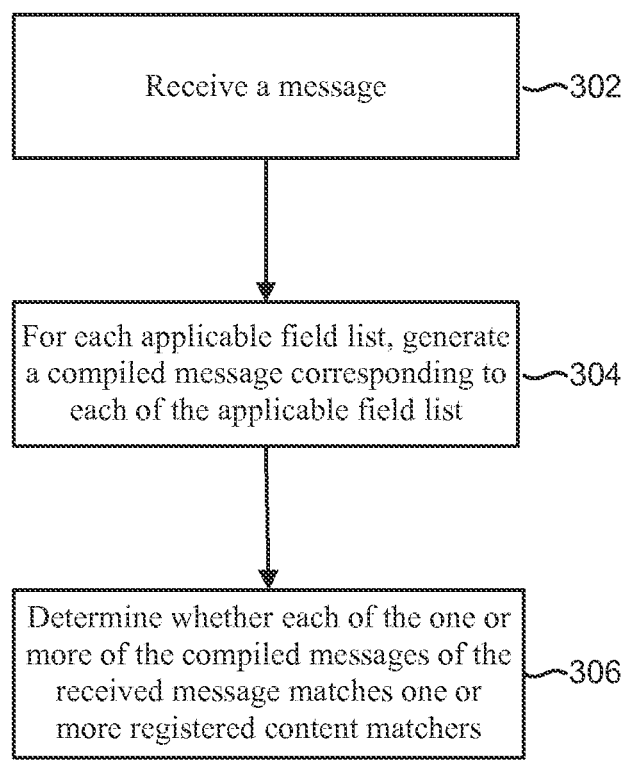
FIG. 3 is a flowchart illustrating an embodiment of a process for processing a message to determine whether the message matches a content matcher.

FIG. 3 is a flowchart illustrating an embodiment of a process for processing a message to determine whether the message matches a content matcher. The process of FIG. 3 may be implemented in access point 102 of FIG. 1.

At 302, a message is received. In some embodiments, receiving the message includes receiving the message from a message provider such as message provider 104 of FIG. 1. The received message may be received via a message stream. Examples of the message include news, stock quote, user messages, and any other content entity. In some embodiments, the message is one of a plurality of received messages. The message may be in a format such as JSON, XML, YAML, or any other key/field/tag organized format.

At 304, for each applicable field list, a compiled message corresponding to each of the applicable field lists is generated. In some embodiments, the field list includes one or more field list(s) generated at 204 of FIG. 2. For example, the candidates for the applicable field lists are unique field lists stored in a data storage structure of unique field lists at 204 of FIG. 2.

In some embodiments, generating the compiled message includes determining the applicable field list(s). In some embodiments, determining the applicable field list(s) includes determining fields included in the received message. The determined fields may be ordered in an order associated with an ordering associated with field list(s) (e.g., alphabetical order). To determine the applicable field list(s), all field list(s) of the unique stored field lists (e.g., determined at 204 of FIG. 2) that are a subset of the fields of the received message are determined. For example, all field list(s) of the unique field lists (compiled from content matchers) that include fields that are all specified in the received message are determined. If the applicable field list(s) is empty, the process ends and it is determined that the message does not match any content matcher and the message will not be delivered to any subscriber.

For each applicable field list of the applicable field list(s), the received message is compiled into a format of the applicable field list. In some embodiments, the compiled message is comparable to a compiled content matcher to determine whether the compiled message matches any content matcher.

In some embodiments, compiling the message includes (1) extracting contents of the message corresponding to the applicable field list (e.g., extract field/value pair included in the message matching each field in the applicable field list), (2) ordering (e.g., order in alphabetical order) field/value pairs included in the extracted contents (e.g., ordering may not be performed if field/value pairs in the message are extracted in the order of fields included in the applicable field list), (3) reversing ordering of each field/value pair so that it becomes a value/field pair (e.g., "age":"21" becomes "21":"age"), and (4) removing white spaces and reformatting resulting content (e.g., remove white spaces and separate each value/field pair with a comma rather than a new line).

For example, two content matchers have been processed and registered.

```
CMatcher1
{
    "name": "steve"
    "age": 21
}
CMatcher2
{
    "name": "mike"
    "phone": "555-1212"
}
```

For content matcher "CMatcher1", the determined field list is ["age","name"] and for content matcher "CMatcher2", the determined field list is ["name","phone"]. When the message below is received, it is determined that the field list for "CMatcher1" is applicable to the message because the message includes both the "age" field and the "name" field and also that the field list for "CMatcher2" is applicable to the message because the message includes both the "name" field and the "phone" field.

```
IncomingMessage
{
    "name": "steve"
    "age": 21
    "phone": "555-1212"
}
```

For the "CMatcher1" field list ["age","name"], the message above is compiled as 21:"age","steve":"name" and for the "CMatcher2" field list ["name","phone"], the message above is compiled as "steve":"name","555-1212":"phone".

At 306, it is determined whether each of the one or more of the compiled messages of the received message matches one or more registered content matchers. In some embodiments, registered content matchers are content matchers received and processed using the process of FIG. 2. In some embodiments, determining whether each of the one or more of the compiled messages of the received message matches one or more registered content matchers includes determining whether each of the one or more of the compiled messages is the same (e.g., same contents) as a compiled content matcher stored in a data storage structure at 208 of FIG. 2. For example, the data storage structure containing registered content matchers is searched to determine whether each compiled message matches any entry of the data storage structure. If a matching compiled content matcher is found for a compiled message, the original message of the compiled message is sent to one or more message subscribers associated with the matching compiled content matcher (e.g., the data storage structure containing registered content matchers stores a listing of one or more message subscribers associated with each compiled content matcher).

The following paragraphs describe a cohesive example of processing content matchers and a message to be distributed to message subscribers as identified by the content matchers. A first content matcher below is received for processing and registration.

```
ContentMatcherA
{
    "topic": "sports"
}
```

This content matcher "ContentMatcherA" is received from a message subscriber "Subscriber 1" that desires to receive messages matching the content matcher. This content matcher is used to generate a unique field list containing the single field ["topic"] (e.g., generated at 204 of FIG. 2) and compiled as "sports":"topic" (e.g., compiled at 206 of FIG. 2).

A second content matcher below is received for processing and registration.

```
ContentMatcherB
{
    "topic": "sports"
    "sub-topic": "baseball"
}
```

This content matcher "ContentMatcherB" is received from a second message subscriber "Subscriber 2" that desires to receive messages matching this content matcher. This content matcher is used to generate a unique field list containing the fields ["sub-topic","topic"] (e.g., generated at 204 of FIG. 2) and compiled as "baseball":"sub-topic","sports": "topic" (e.g., compiled at 206 of FIG. 2).

A third content matcher below is received for processing and registration.

```
ContentMatcherC
{
    "topic": "gossip"
}
```

This content matcher "ContentMatcherC" is received from a third message subscriber "Subscriber 3" that desires to receive messages matching the content matcher. This content matcher is used to generate a field list containing the single field ["topic"] (e.g., generated at 204 of FIG. 2). However because this field list is not unique (i.e., "ContentMatcherA" generated the same field list), this field list is not stored as unique. This content matcher is compiled as "gossip":"topic" (e.g., compiled at 206 of FIG. 2).

At this point a data storage structure containing the registered compiled content matchers (e.g., data storage structure stored at 208 of FIG. 2) will contain three entries:

| | |
|---|---|
| "gossip":"topic" | Subscriber 3 |
| "baseball":"sub-topic", "sports":"topic" | Subscriber 2 |
| "sports":"topic" | Subscriber 1 |

In the current example, the following message is received.

```
MessageA
{
    "topic":"sports",
    sub-topic":"basketball",
    "url":"http://basketball.net"
}
```

This received message is compiled for each of the applicable field lists previously determined using the registered content matchers. For the field list ["topic"], the received message is compiled as "sports":"topic" (e.g., compiled at 304 of FIG. 3). This compiled message is compared with registered compiled content matchers (e.g., compared at 306 of FIG. 3) and it is determined that this compiled message matches the content matcher associated with Subscriber 1. Subscriber 1 is provided the entire received message. For the field list ["sub-topic","topic"], the received message is compiled as "basketball":"sub-topic","sports":"topic" (e.g., compiled at 304 of FIG. 3). This compiled message is compared with registered compiled content matchers (e.g., compared at 306 of FIG. 3) and it is determined that this compiled message does not match any compiled content matchers and no other subscriber is provided the received message.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled to the processor and configured to provide the processor with instructions, wherein the processor is configured to:
      receive, from a message provider server via a network, a message in a first format, wherein the message is part of a message stream comprising a plurality of messages and wherein the message is comprised of one or more structured field value pairs;

receive one or more content matchers from a subscriber device via the network, wherein the one or more content matchers includes a content matcher, wherein the content matcher indicates one or more messages of the message stream to which the subscriber device is subscribed to receive, wherein the content matcher includes one or more structured field value pairs specified by a subscriber, wherein the one or more structured field value pairs of the content matcher indicate content of the one or more messages to which the subscriber device is subscribed to receive, wherein a first field group of a set of field groups of one or more fields is determined by extracting all field identifiers included in the one or more content matchers;

convert the content matcher into a standardized format, wherein the standardized format rearranges the one or more structured field value pairs of the content matcher in a first determined order;

compile each of the one or more content matchers, wherein compiling at least one of the one or more content matchers includes reversing ordering of each of the one or more field value pairs so that a field value pair becomes a value field pair;

generate a compiled message at least in part by rearranging the one or more structured field values pairs of the message in a second determined order;

determine whether the one or more structured field value pairs of the compiled message matches the one or more structured field value pairs of the converted content matcher, wherein a structured field value pair of the compiled message matches a structured field value pair of the converted content matcher in the event a field of the structured field value pair of the compiled message matches a field of the structured field value pair of the converted content matcher and a value of the structured field value pair of the compiled message matches a value of the structured field value pair of the converted content matcher; and in response to determining that the one or more structured field value pairs of the compiled message match the one or more structured field value pairs of the converted content matcher, distribute to the subscriber device via the network the message that is comprised of one or more structured field value pairs to the subscriber device.

2. The system of claim 1, wherein each of the one or more content matchers specifies at least one field and an associated value.

3. The system of claim 2, wherein the associated value is a Boolean value.

4. The system of claim 1, wherein the content matcher and the message are specified in JavaScript Object Notation.

5. The system of claim 1, wherein each of the one or more content matchers is associated with one or more identifiers of one or more subscribers that are identified to receive any message that matches the associated content matcher.

6. The system of claim 1, wherein the all field identifiers is arranged in the field group in an order associated with an alphabetical order of the all field identifiers.

7. The system of claim 1, wherein a set of field groups is determined by determining all fields included in each of the one or more content matchers and storing the fields of each content matcher as a grouping only if a same grouping has not been previously stored.

8. The system of claim 1, wherein the one or more compiled content matchers are stored in a data storage structure that associates each of the one or more compiled content matchers with one or more message subscribers.

9. The system of claim 1, wherein a field group of a set of field groups is identified as applicable to the message at least in part by determining all fields included in the one or more content matchers and determining which field group of the set of field groups is at least a subset of the all fields of the message.

10. The system of claim 1, wherein generating the compiled message includes extracting one or more field value pairs included in the message for each field of the one or more field value pairs and ordering one or more field value pairs in the determined order.

11. The system of claim 10, wherein generating the compiled message includes reversing ordering of each of the one or more field value pairs so that a field value pair becomes a value field pair.

12. The system of claim 1, wherein determining whether the one or more structured field value pairs of the compiled message matches the one or more structured field value pairs of the converted content matcher includes searching a data storage structure storing a compiled version of one or more content matchers to determine whether the one or more structured field value pairs of the compiled message matches one or more of the one or more structured field value pairs of one or more content matchers.

13. A method, comprising:

receiving, from a message provider server via a network, a message in a first format, wherein the message is part of a message stream comprising a plurality of messages and wherein the message is comprised of one or more structured field value pairs;

receiving one or more content matchers from a subscriber device via the network, wherein the one or more content matchers includes a content matcher, wherein the content matcher indicates one or more messages of the message stream to which the subscriber device is subscribed to receive, wherein the content matcher includes one or more structured field value pairs specified by a subscriber, wherein the one or more structured field value pairs of the content matcher indicate content of the one or more messages to which the subscriber device is subscribed to receive, wherein a first field group of a set of field groups of one or more fields is determined by extracting all field identifiers included in the one or more content matchers;

converting the content matcher into a standardized format, wherein the standardized format rearranges the one or more structured field value pairs of the content matcher in a first determined order;

compiling each of the one or more content matchers, wherein compiling at least one of the one or more content matchers includes reversing ordering of each of the one or more field value pairs so that a field value pair becomes a value field pair;

generating a compiled message at least in part by rearranging the one or more structured field value pairs of the message in a second determined order;

determining, using a processor, whether the one or more structured field value pairs of the compiled message matches the one or more structured field value pairs of the converted content matcher, wherein a structured field value pair of the compiled message matches a structured field value pair of the converted content matcher in the event a field of the structured field value pair of the compiled message matches a field of the structured field value pair of the converted content matcher and a value of the structured field value pair of the compiled message matches a value of the structured field value pair of the converted content matcher; and in response to determining that the one or more structured field value pairs of the compiled message match the one or more structured field value pairs of the converted content matcher, distributing to the subscriber device via the network the message that is comprised of one or more structured field value pairs to the subscriber device.

14. A computer program product, the computer program product being embodied in a tangible non-transitory computer readable storage medium and comprising computer instructions for:

receiving, from a message provider server via a network, a message in a first format, wherein the message is part of a message stream comprising a plurality of messages and wherein the message is comprised of one or more structured field value pairs;

receiving one or more content matchers from a subscriber device via the network, wherein the one or more content matchers includes a content matcher, wherein the content matcher indicates one or more messages of the message stream to which the subscriber device is subscribed to receive, wherein the content matcher includes one or more structured field value pairs specified by a subscriber, wherein the one or more structured field value pairs of the content matcher indicate content of the one or more messages to which the subscriber device is subscribed to receive, wherein a first field group of a set of field groups of one or more fields is determined by extracting all field identifiers included in the one or more content matchers;

converting the content matcher into a standardized format, wherein the standardized format rearranges the one or more structured field value pairs of the content matcher in a first determined order;

compiling each of the one or more content matchers, wherein compiling at least one of the one or more content matchers includes reversing ordering of each of the one or more field value pairs so that a field value pair becomes a value field pair;

generating a compiled message at least in part by rearranging the one or more structured field value pairs of the message in a second determined order;

determining whether the one or more structured field value pairs of the compiled message matches the one or more structured field value pairs of the converted content matcher, wherein a structured field value pair of the compiled message matches a structured field value pair of the converted content matcher in the event a field of the structured field value pair of the compiled message matches a field of the structured field value pair of the converted content matcher and a value of the structured field value pair of the compiled message matches a value of the structured field value pair of the converted content matcher; and in response to determining that the one or more structured field value pairs of the compiled message match the one or more structured field value pairs of the converted content matcher, distributing to the subscriber device via the network the message that is comprised of one or more structured field value pairs to the subscriber device.

* * * * *